(12) United States Patent
Oishi

(10) Patent No.: US 11,032,547 B2
(45) Date of Patent: Jun. 8, 2021

(54) IMAGE ENCODING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Akihiro Oishi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/600,817

(22) Filed: Oct. 14, 2019

(65) Prior Publication Data
US 2020/0128248 A1 Apr. 23, 2020

(30) Foreign Application Priority Data
Oct. 19, 2018 (JP) .............................. JP2018-197844

(51) Int. Cl.
| | |
|---|---|
| *H04N 7/12* | (2006.01) |
| *H04N 19/13* | (2014.01) |
| *H04N 19/625* | (2014.01) |
| *H04N 19/182* | (2014.01) |
| *H04N 19/154* | (2014.01) |
| *H04N 19/147* | (2014.01) |

(Continued)

(52) U.S. Cl.
CPC ............ *H04N 19/13* (2014.11); *H04N 19/117* (2014.11); *H04N 19/147* (2014.11); *H04N 19/154* (2014.11); *H04N 19/182* (2014.11); *H04N 19/186* (2014.11); *H04N 19/625* (2014.11)

(58) Field of Classification Search
CPC .... H04N 19/117; H04N 19/13; H04N 19/147; H04N 19/154; H04N 19/182; H04N 19/186; H04N 19/625; H04N 19/85
See application file for complete search history.

(56) References Cited

U.S. PATENT DOCUMENTS

| | | | |
|---|---|---|---|
| 2005/0100234 A1* | 5/2005 | Ferriere ................. | H04N 19/36 382/240 |
| 2011/0187891 A1* | 8/2011 | Zhang ..................... | H04N 9/73 348/223.1 |

(Continued)

FOREIGN PATENT DOCUMENTS

JP 2017-208810 A 11/2017

*Primary Examiner* — Peet Dhillon
(74) *Attorney, Agent, or Firm* — Cowan, Liebowitz & Latman, P.C.

(57) ABSTRACT

This invention suppresses color shifts caused by quantization parameters used when encoding RAW image. An apparatus comprises a calculator which finds a color temperature of RAW image of a target frame, and calculates a gain value for each of color components in order to apply white balancing to the RAW image, a generator which generates a plurality of planes, each plane constituted by data of a single color component, from the RAW image, an adjusting unit which adjusts the white balance of each plane on the basis of the calculated gain, an encoder which encodes each plane by frequency-transforming, quantizing, and encoding each plane, and a controller which switches between encoding the plurality of planes generated by the generating unit or encoding the plurality of planes adjusted by the adjusting unit, on the basis of quantization parameters.

5 Claims, 13 Drawing Sheets

(51) Int. Cl.
*H04N 19/186* (2014.01)
*H04N 19/117* (2014.01)

(56) References Cited

U.S. PATENT DOCUMENTS

2015/0098499 A1* 4/2015 Tominaga ............ H04N 19/186
                                               375/240.02
2017/0118476 A1* 4/2017 Sakamoto ............... G06T 5/002
2020/0120321 A1* 4/2020 Tian ....................... H04N 5/243

* cited by examiner

IMAGE ENCODING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to RAW image data encoding technology.

Description of the Related Art

Image capturing apparatuses such as digital cameras or electronic devices having image capturing functions carry out what is known as developing processing. In this processing, raw image information (a RAW image) obtained by an image sensor is subjected to debayering (demosaicing) and converted into signals constituted by luma and chroma components, and each signal is then subjected to noise removal, optical distortion correction, image optimization, and the like. The developed luma and chroma signals are then compressed, encoded, and recorded into a recording medium.

There are also image recording apparatuses capable of recording RAW images. A RAW image is a type of data that keeps correction, degradation, and the like to a minimum. Advanced users therefore prefer to use RAW images for editing after shooting. However, RAW images contain very large amounts of data, and it would therefore be useful to suppress the amount of data so that as many images as possible can be recorded into a recording medium. The data amounts of RAW images are therefore suppressed by compressing the RAW images. However, depending on the shooting conditions, compressing an image may harm the image quality. Japanese Patent Laid-Open No. 2017-208810 discloses a configuration in which RAW data is subjected to white balancing, after which each color component is compressed and encoded.

However, the following issue arises when using the stated past technique with RAW images, in which the data changes depending on the shooting conditions, the level of difficulty of encoding the input image, and so on. That is, applying white balancing can, depending on the color component, result in the value reaching the upper limit of the possible pixel value range, which makes it necessary to clip the value. If the white balance is changed after developing, and many parts need to be clipped, the hue may change as a result.

SUMMARY OF THE INVENTION

Having been achieved in light of the aforementioned issue, the present invention provides a technique for suppressing color shifts caused by quantization parameters used to encode RAW image data.

According to an aspect of the invention, there is provided an image encoding apparatus that encodes a frame obtained by an image capturing unit as RAW image data, the apparatus comprising: a calculating unit that finds a color temperature of the RAW image data of a target frame which is to be encoded, and calculates a gain value for each of color components in order to apply white balancing to the RAW image data; a generating unit that generates a plurality of planes, each plane constituted by data of a single color component, from the RAW image data in the target frame; an adjusting unit that adjusts the white balance of each plane obtained by the generating unit on the basis of the gain calculated by the calculating unit; an encoding unit that encodes each plane by frequency-transforming, quantizing, and encoding each plane; and a control unit that, when each plane of the target frame is encoded by the encoding unit, switches between encoding the plurality of planes generated by the generating unit or encoding the plurality of planes adjusted by the adjusting unit, on the basis of quantization parameters.

According to the present invention, color shifts caused by quantization parameters used when encoding RAW image data can be suppressed.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the appended drawings. Although the following embodiments describe examples in which an image encoding apparatus is provided in an image capturing apparatus such as a digital camera, the image encoding apparatus may be applied in any apparatus having an image capturing function, such as a smartphone. In other words, the embodiments should only be taken as examples.

First Embodiment

Figure 1:
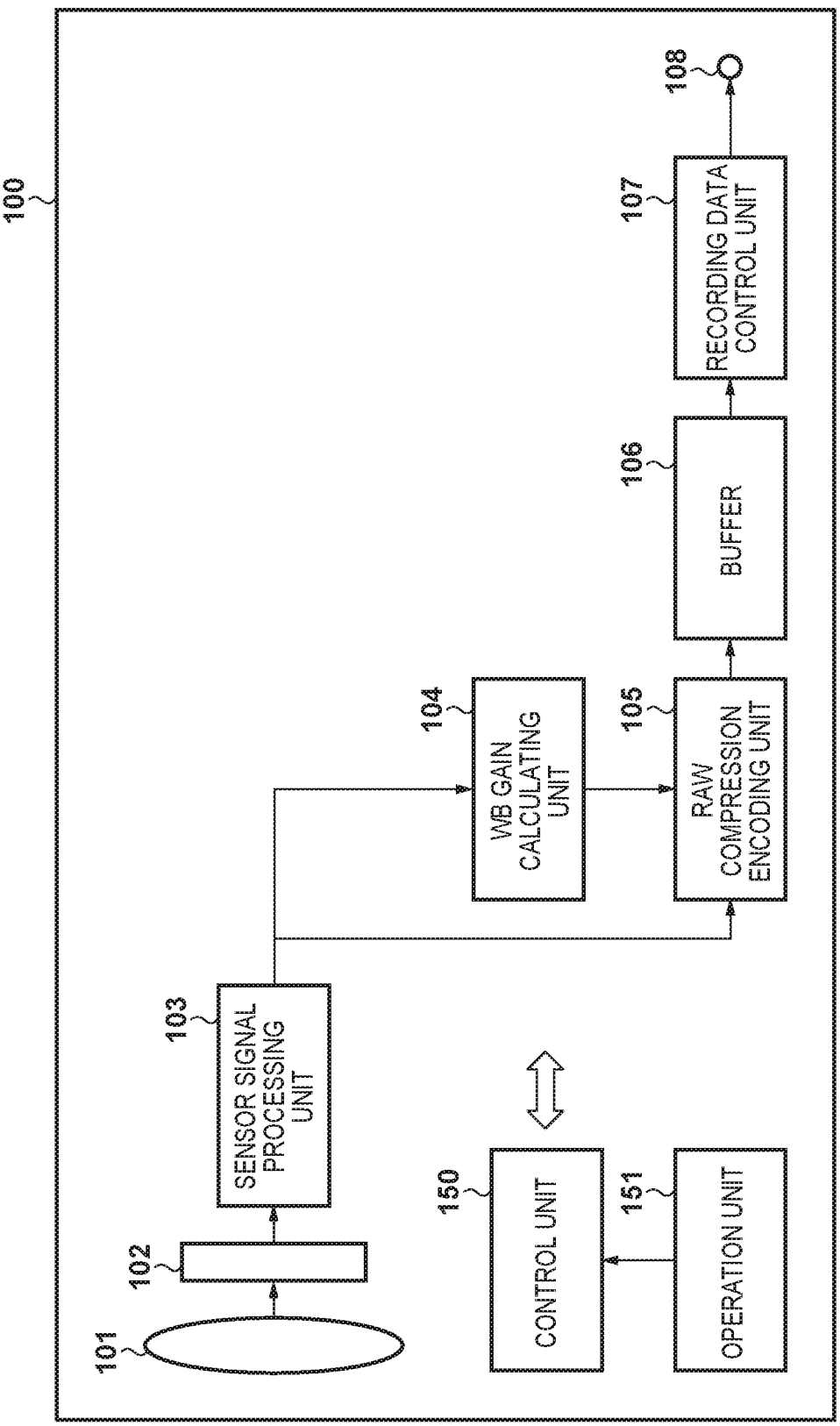
FIG. 1 is a block diagram illustrating an example of the configuration of an image encoding apparatus according embodiments.

FIG. 1 is a block diagram illustrating the main components of an image capturing apparatus 100) according to a first embodiment. The image capturing apparatus 100 includes an imaging optical unit 101, an imaging sensor 102, a sensor signal processing unit 103, a WB gain calculating unit 104, a RAW compression encoding unit 105, a buffer 106, a recording data control unit 107, a control unit 150, and an operation unit 151.

With the configuration illustrated here, when a user inputs an instruction to start shooting operations through the operation unit 151, an optical image of a subject of which an image is to be captured is input through the imaging optical unit 101 and formed on the imaging sensor 102. The imaging sensor 102 converts the intensity of light, which passes through red (R), green (G), and blue (B) color filters arranged on a pixel-by-pixel basis, into electrical signals. Note that the imaging sensor 102 is assumed to capture images at a speed of, for example, 30 frames per second.

Figure 2:
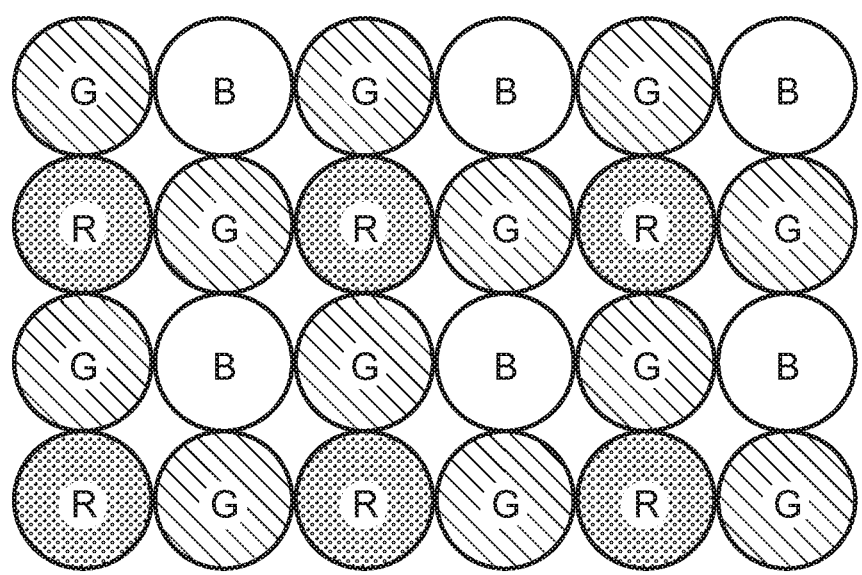
FIG. 2 is a descriptive diagram illustrating a pixel array.

FIG. 2 illustrates an example of the color filters arranged on the imaging sensor 102. As illustrated in FIG. 2, red (R), green (G), and blue (B) are arranged in mosaic form on a pixel-by-pixel basis, with one red pixel, one blue pixel, and two green pixels constituting a set of four, i.e., 2×2, pixels, which are arranged in a regular manner. This pixel arrangement is typically called a Bayer array.

The electrical signal obtained by the imaging sensor 102 is converted into digital image data and supplied to the sensor signal processing unit 103. The sensor signal processing unit 103 then carries out pixel restoration processing. The restoration processing includes processing for interpolating a pixel to be restored using the values of the surrounding pixels, subtracting a predetermined offset value, and so on for missing or unreliable pixels in the imaging sensor 102. In the present embodiment, the image data output from the sensor signal processing unit 103 will be called RAW image data, which indicates a raw (undeveloped) image still in the Bayer array format. The RAW image data is supplied to the WB gain calculating unit 104 and the RAW compression encoding unit 105.

The WB gain calculating unit 104 adjusts the white balance using the green (G) component of the input RAW image data as a reference, and thus calculates a gain value by which to multiply the red (R) and blue (B) components. The gain value can be calculated for each color component on the basis of the color temperature. The WB gain calculating unit 104 supplies the calculated WB gain value to the RAW compression encoding unit 105.

The RAW compression encoding unit 105 generates data of a plurality of sub-bands by subjecting the RAW image data input from the sensor signal processing unit 103 to a wavelet transform, quantizes and entropy-encodes that data, and then stores compressed and encoded data in the buffer 106.

Figure 3:
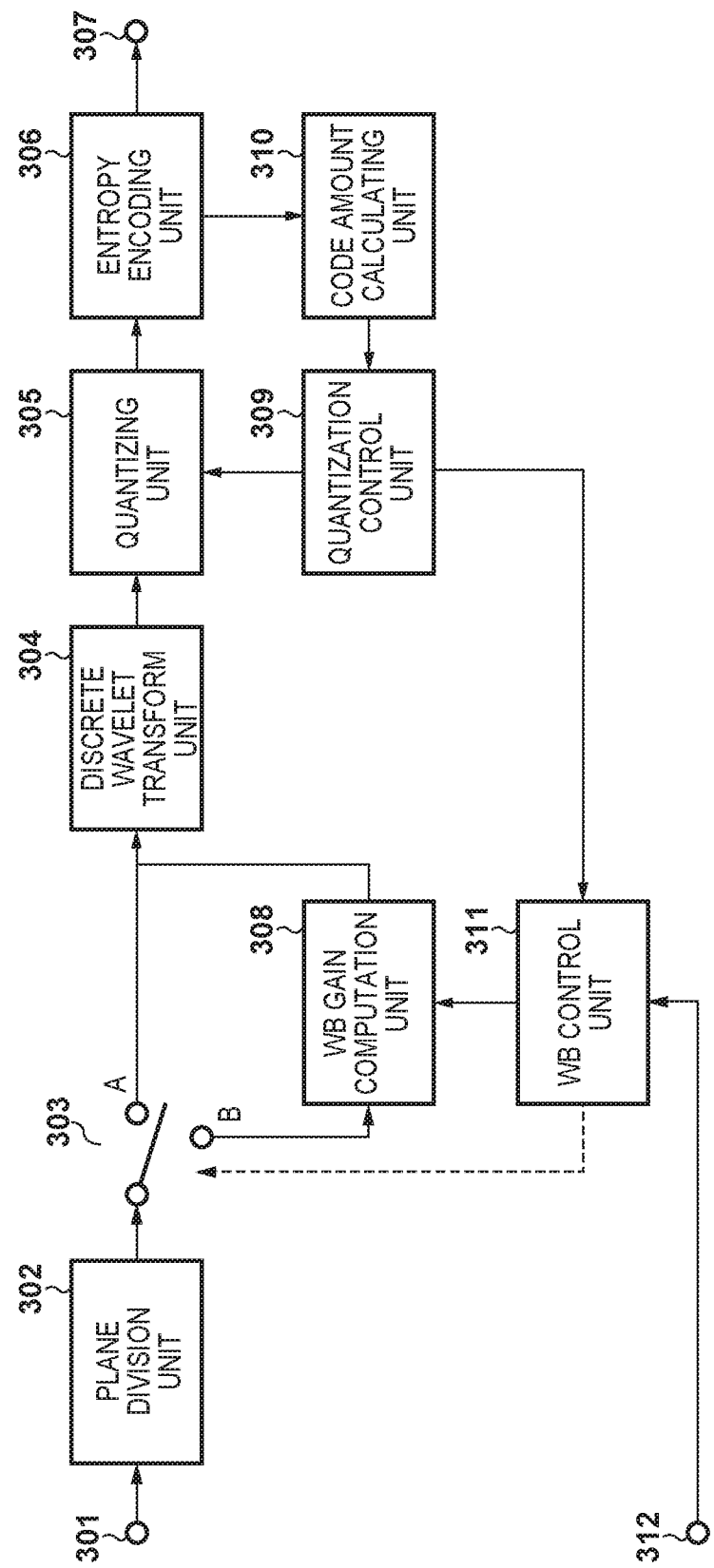
FIG. 3 is a block diagram illustrating a RAW compression encoding unit.

FIG. 3 is a block diagram illustrating the RAW compression encoding unit 105 according to the embodiment. Processing carried out by the RAW compression encoding unit 105 will be described in detail next with reference to FIG. 3.

The RAW compression encoding unit 105 includes: input terminals 301 and 312; a plane division unit 302; a switch 303; a discrete wavelet transform unit 304; a quantizing unit 305; an entropy encoding unit 306; an output terminal 307; a WB gain computation unit 308; a quantization control unit 309; a code amount calculating unit 310; and a WB control unit 311.

RAW image data input from the input terminal 301 is supplied to the plane division unit 302. The plane division unit 302 converts the input RAW image data into four planes, each of which is constituted by pixels of a single color component.

The RAW image data is, as mentioned earlier, a collection of pixels in a Bayer array, and thus there are twice as many green component pixels as there are red (or blue) components pixels. Accordingly, the green pixel components adjacent to the red component pixels in the horizontal direction are defined as G1, and the green pixel components adjacent to the blue component pixels in the horizontal direction are defined as G2. From the input RAW image data, the plane division unit 302 generates a G1 plane constituted only by G1 component pixels, a G2 plane constituted only by G2 component pixels, an R plane constituted only by R component pixels, and a B plane constituted only by B component pixels. The four pieces of plane data generated by the plane division unit 302 are supplied to the switch 303.

The switch 303 receives a selection signal indicating whether or not to apply white balancing from the WB control unit 311, and outputs to either the discrete wavelet transform unit 304 or the WB gain computation unit 308 as an output destination. When a selection signal indicating that white balancing is not to be applied has been received, the switch 303 supplies the input plane data to the discrete wavelet transform unit 304 through a terminal A. When a selection signal indicating that white balancing is to be applied has been received, the switch 303 supplies the input plane data to the WB gain computation unit 308 through a terminal B.

The WB control unit 311 uses the WB gain value calculated by the WB gain calculating unit 104, obtained from the input terminal 312, and quantization parameters Qp from the quantization control unit 309 (mentioned later), to determine the selection signal for the switch 303 (details will be described later).

The discrete wavelet transform unit 304 frequency-transforms the input plane data to obtain transform coefficients for a plurality of frequency ranges (sub-bands).

Figure 4:
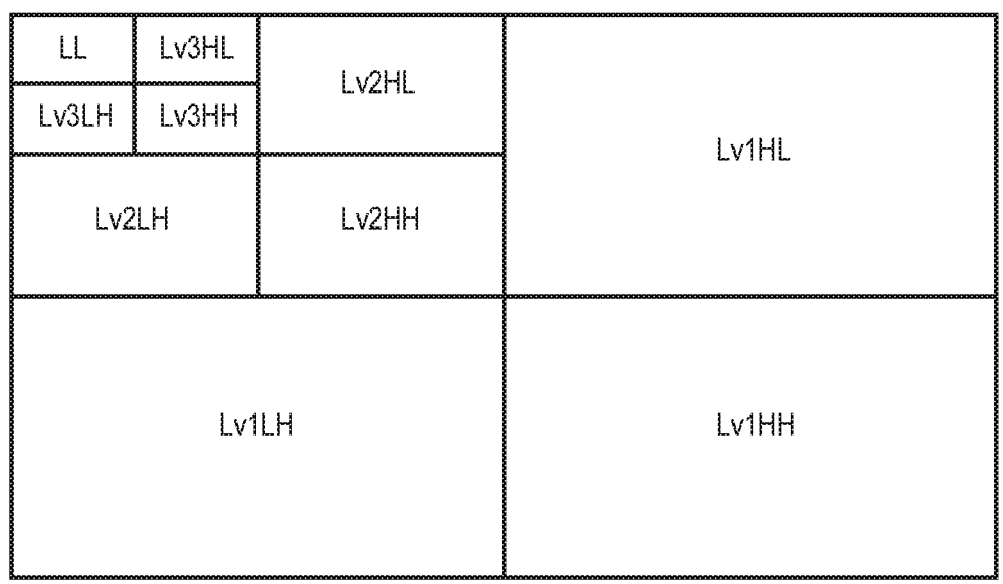
FIG. 4 is a sub-band formation diagram illustrating decomposition level 3 of a discrete wavelet transform (DWT).

FIG. 4 is a sub-band formation diagram illustrating decomposition level 3, obtained when vertical and horizontal filtering using a discrete wavelet transform (DWT) are carried out three times each. The present embodiment assumes that the discrete wavelet transform unit 304 carries out the DWT three times to generate sub-bands at decomposition level 3.

The DWT decomposes a frequency band into multiple bands by applying a filter in both the vertical and horizontal directions. The decomposition level can be increased by recursively applying DWTs to the low-frequency sub-bands generated through the stated transform, which increases the fineness of the frequency decomposition, as illustrated in FIG. 4. In FIG. 4, "L" and "H" indicate low and high frequencies, respectively. In terms of the order thereof, the former indicates the band resulting from the horizontal filtering, and the latter indicates the band resulting from the vertical filtering. The number after "Lv" indicates the DWT decomposition level. "LL" indicates the lowest-frequency sub-band. The discrete wavelet transform unit 304 carries out this discrete wavelet transform processing, and supplies the obtained transform coefficient data to the quantizing unit 305 on a sub-band-by-sub-band basis.

The quantizing unit 305 uses the quantization parameters Qp generated by the quantization control unit 309 to quantize the transform coefficients on a transform coefficient-by-transform coefficient basis. Note that the quantization parameters Qp are parameters in which a higher value contributes more to a reduction in the code amount, but which also involve a drop in image quality caused by an increase in quantization error.

The entropy encoding unit 306 generates encoded data by entropy-encoding the transform coefficient data that has been quantized by the quantizing unit 305. The entropy encoding unit 306 outputs the generated encoded data to the buffer 106 through the output terminal 307, as well as to the code amount calculating unit 310.

The code amount calculating unit 310 calculates a code amount on a sub-band-by-sub-band basis, and a code amount on a picture-by-picture basis, from the input encoded data. The code amount calculating unit 310 then supplies information indicating the calculated code amounts to the quantization control unit 309.

On the basis of the information from the code amount calculating unit 310, the quantization control unit 309 calculates a picture target code amount and a sub-band target code amount, and generates base quantization parameters Qpbase at which each sub-band will be the optimal sub-band in the next picture.

Note that to generate the base quantization parameters Qpbase, preliminary encoding may first be carried out on the image before recording, and the above-described processing may then be carried out.

The present embodiment will describe the base quantization parameters Qpbase as quantization parameters used for sub-band IvIHL indicated in FIG. 4. The quantization parameters for the other sub-bands are calculated from the base quantization parameters Qpbase.

Figure 5:
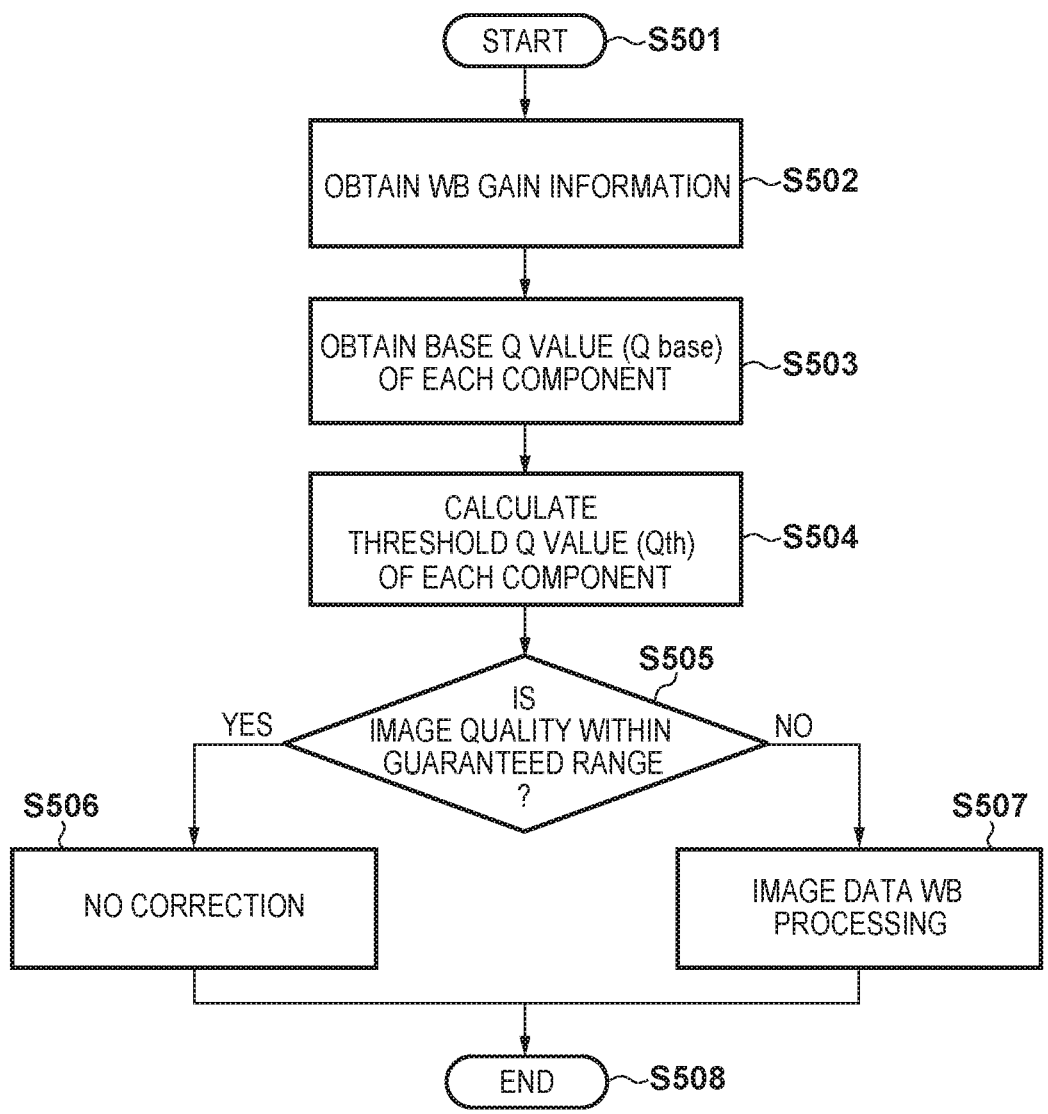
FIG. 5 is a flowchart illustrating an example of processing by a WB control unit.

The processing by the WB control unit 311 will be described in detail next. FIG. 5 is a flowchart illustrating a processing sequence executed by the WB control unit 311. The details of the processing by the WB control unit 311 will be described next with reference to FIG. 5.

The WB control unit 311 starts the processing in step S501. In step S502, the WB control unit 311 obtains WB gain information for the RAW image data of a current frame to be encoded, from the WB gain calculating unit 104 through the input terminal 312. The WB gain information has a different gain value for each color component. The gain values for R. G, and B are represented by Gain_R, Gain_G, and Gain_B, respectively. However, in the present embodiment, G (green) is taken as a reference, and Gain_G is fixed at 1. In other words, the R and B gain values are values relative to the G gain value. Thus the WB control unit 311 need only obtain Gain_R and Gain_B.

Next, in step S503, the WB control unit 311 obtains the base quantization parameters for the plane Lv1 HL of each color component, among the quantization parameters output by the quantization control unit 309. In this embodiment, there are the R, G1, G2, and B planes, and thus the base quantization parameters for these are represented by Qbase_R, Qbase_G1, Qbase_G2, and Qbase_B, respectively. Note that these base quantization parameters are parameters from when encoding the frame immediately before the frame of interest being encoded.

Next, in step S504, the WB control unit 311 calculates thresholds Qth_R and Qth_B at which the image quality can be guaranteed, for each of the red (R) and blue (B) color components. Desired quantization parameters are set for these thresholds in advance. Because green (G) is used as the reference, a threshold Qth_G for green (G) serves as a reference value for the thresholds of the other components. The WB control unit 311 then calculates the red (R) and blue (B) thresholds according to the following equations (1) and (2).

$$Qth\_R = Qth\_G / Gain\_R \quad (1)$$

$$Qth\_B = Qth\_G / Gain\_B \quad (2)$$

Then, in step S505, the WB control unit 311 determines whether or not the image quality for each of the color components is within a guaranteed range, by comparing the thresholds calculated for each color component with the corresponding gain value. Specifically, the WB control unit 311 determines whether or not the following equations (3) to (6) are satisfied.

for red (R), $$Qth\_R > Qbase\_R \quad (3)$$

for green (G1), $$Qth\_G > Qbase\_G1 \quad (4)$$

for green (G2), $$Qth\_G > Qbase\_G2 \quad (5)$$

for blue (B), $$Qth\_B > Qbase\_B \quad (6)$$

All of the above (3) to (6) being satisfied means that the quantization steps for all of the color components are sufficiently small, and it is unlikely that color shifts will occur due to quantization. In other words, the WB control unit 311 determines whether each input plane is within the range where the image quality is guaranteed. Accordingly, the WB control unit 311 moves the processing to step S506, where the switch 303 outputs a control signal for selecting the terminal A. In other words, as a result, the picture of interest is encoded without carrying out any WB processing.

However, when even one of equations (3) to (6) is not satisfied, the WB control unit 311 determines that the image quality is outside the guaranteed range. Accordingly, the WB control unit 311 moves the processing to step S507, w % here the switch 303 outputs a control signal for selecting the terminal B. As a result, the WB gain computation unit 308 adjusts the gain for the input planes of each component, according to the gain values computed by the WB gain calculating unit 104, and then supplies the adjusted planes to the discrete wavelet transform unit 304.

Once the process of either step S506 or S507 ends, in step S508, the WB control unit 311 ends the present processing. Because G1 and G2 indicate the same color green, one of equations (4) and (5) may be excluded from the determination.

Figure 6A:
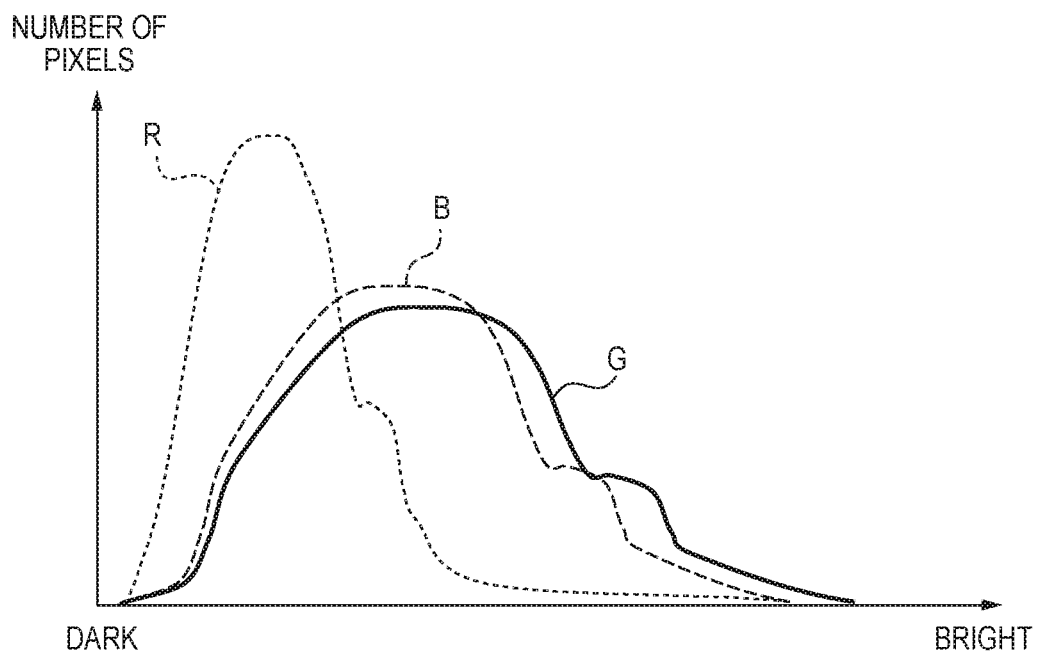
FIGS. 6A and 6B are histograms illustrating image data according to embodiments.
Figure 6B:
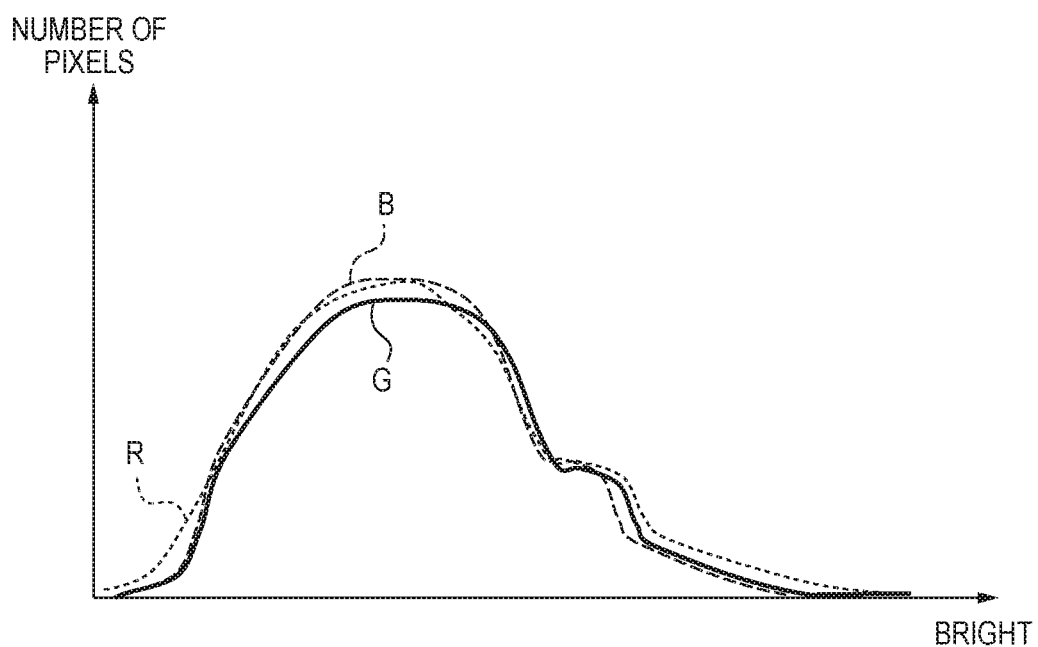

FIG. 6A is a histogram of each of the RGB planes in a given one frame of RAW image data. When the subject is achromatic, imbalance between the frequencies of the color components becomes extremely low when white balance processing is carried out. FIG. 6B is a histogram of each of the RGB planes after the white balance processing has been carried out.

As can be seen from FIG. 6A, even if the subject is achromatic, the planes do not have the same values, and instead have different values, before the white balance processing is carried out.

Figure 7A:
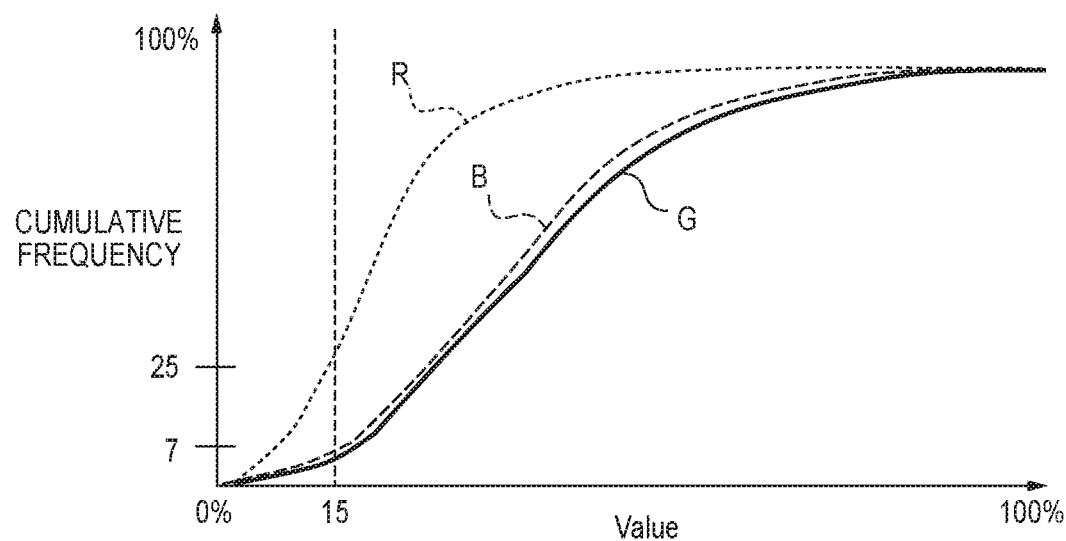
FIGS. 7A and 7B are graphs illustrating cumulative frequencies of wavelet coefficients for each of color components.

FIG. 7A is a graph indicating the cumulative frequencies of the wavelet coefficients for the R, G1 (which is the same as G2), and B planes indicated in FIG. 6A.

In FIG. 6A, the R plane has a narrower range than the other planes. As such, the wavelet coefficient of the R plane has a lower value, which means that the cumulative frequency of the wavelet coefficient approaches a maximum value more quickly than the other planes. This cumulative frequency graph can be estimated from the range of a plane by using the histogram of that plane.

Furthermore, a broken line is present at the location of 15% along the horizontal axis. If the bit width of the input data is 10 bits and the quantization coefficient at the location of the broken line is 10, dividing the wavelet coefficient data by 10 and rounding the resultant off results in a quotient of 0 for wavelet coefficients less than or equal to 9. Accordingly, even if inverse quantization is carried out, the wavelet coefficients will be 0 even after the inverse quantization. However, it is assumed that the quantization coefficients and the quantization parameters are in a 1-to-1 relationship, and that the quantization coefficient is equivalent to the quotient.

Looking at each plane at the location of 15% along the horizontal axis, R is 25%, B is 7%, and G1 is 6%, for coefficients of 0. With RAW image data that has not been subjected to white balance processing, using the same quantization parameters for each plane will result in a drastic change in the percentage of wavelet coefficients which are 0. Thus there is a problem in that even with an achromatic image, if only the R wavelet coefficient is 0, the hue of that part will change.

When the input image has a high level of encoding difficulty, it is necessary to increase the quantization parameters and suppress the code amount in order to suppress the code amount to a set amount. Accordingly, if the gain is different for each of the color components as illustrated in FIG. 6A, the hue will change from location to location, which leads to an increased amount of image quality degradation caused by color shifts.

Figure 7B:
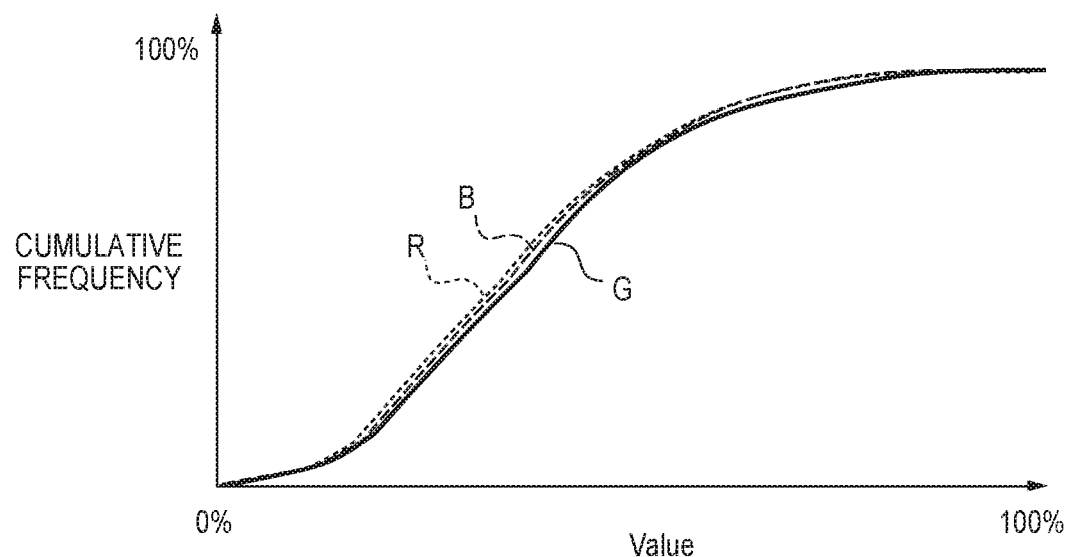

FIG. 7B is a graph illustrating a state after white balancing by multiplying the color components illustrated in FIG. 7A by gain values. Carrying out the white balancing makes it possible to suppress situations where the wavelet coefficient is 0 only for specific color components, which in turn makes it possible to suppress changes in the hue.

However, when carrying out white balancing, the gain values are multiplied. Thus depending on the color component, there are situations where the value is clipped at an upper limit value. The white balancing therefore involves a trade-off, but because the amount of image degradation is extremely small compared to when the wavelet coefficient is 0, the hue changes, and color shifting occurs, that image degradation is almost impossible to notice.

Although the foregoing describes a situation where the same quantization parameters are used for each of the R, G1, G2, and B planes, different quantization parameters may be used for those planes instead. Furthermore, because there is the problem of the hue changing as described with reference to FIG. 7A, the thresholds Qth_R, Qth_G, and Qth_B are necessary so that hue changes, image degradation, and so on do not arise in areas that can be visually recognized.

Descriptions of the operations will be continued, returning to FIG. 1. The recording data control unit 107 generates predetermined header information, including information necessary for decoding, for the encoded data stored in the buffer 106, adds that information to the following encoded data, and outputs the resulting data as a file from an output terminal 108. The output destination is not particularly limited, and may be a non-volatile storage medium such as a memory card, for example.

The header information generated by the recording data control unit 107, and the data format thereof, will be described next.

Figure 8:
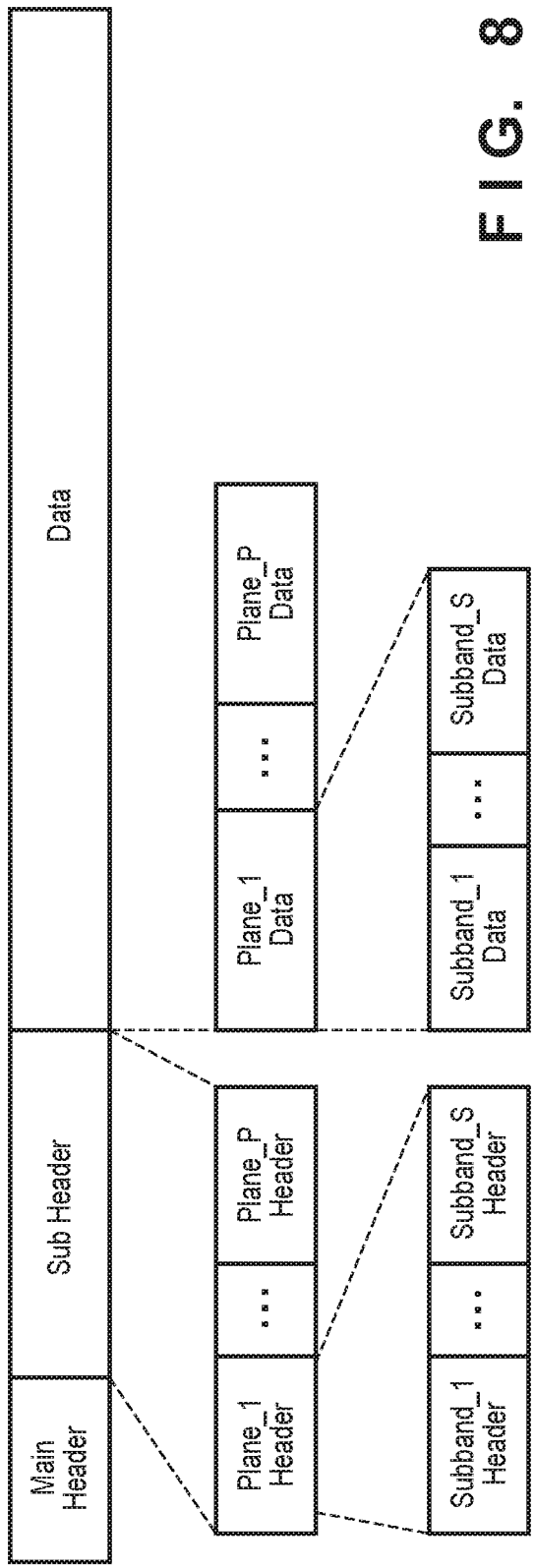
FIG. 8 is a diagram illustrating an example of a file format.

FIG. 8 illustrates an example of the file format. The file is divided into a header part and a data part, and the header part includes a main header part and a sub header part.

Figure 9:
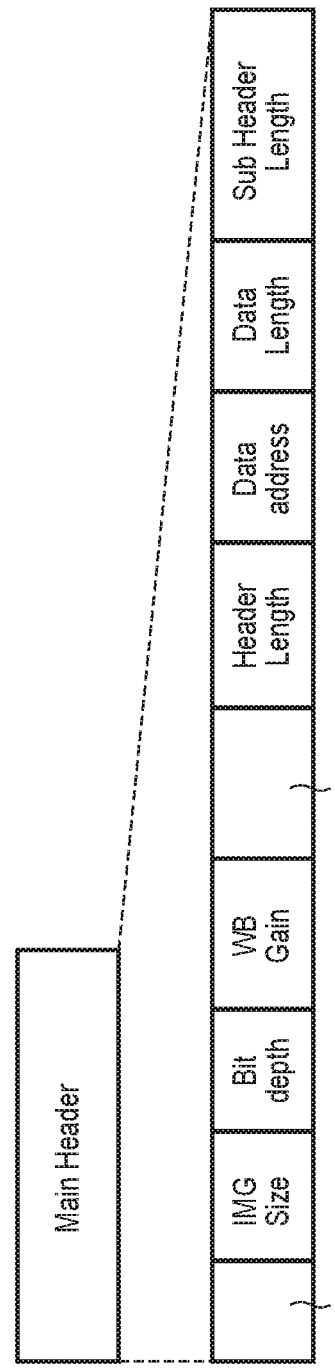
FIG. 9 is a diagram illustrating an example of the data structure of a main header part.

FIG. 9 illustrates the data structure of the main header part. Here, an identification number, the image size, the image bit width, the WB gain value, the wavelet transform decomposition level, the header size, a thumbnail image, and an address and data size of the data part are included. Note that the identification number in FIG. 9 is a number indicating the main header, and the other headers are also recorded so that they can be identified using this identification number. The identification number therefore differs from header to header.

Meanwhile, when the switch 303 selects the terminal A and no white balancing is applied, the value output by the WB gain calculating unit 104 is recorded in the header. This is done so that the value can be usefully applied as an indication value for WB processing when the user develops or edits the image later.

However, when the switch 303 selects the terminal B and processing for applying white balancing has been carried out by the WB gain computation unit 308, this means that the encoded RAW image data is encoded data from after the gain value has been multiplied. Accordingly, a gain value of "1", substantially equivalent to "no gain correction", is recorded in the header.

Figure 10:
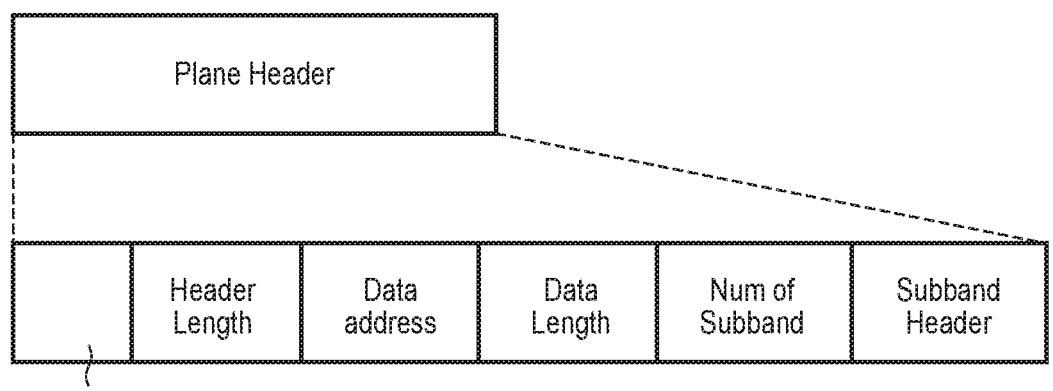
FIG. 10 is a diagram illustrating an example of the data structure of a plane header part.

FIG. 10 illustrates the data structure of a plane header part. Here, an identification number, a header state, the header size, the address and data size of the data part, a sub-band number, and a sub-band header are recorded.

Figure 11:
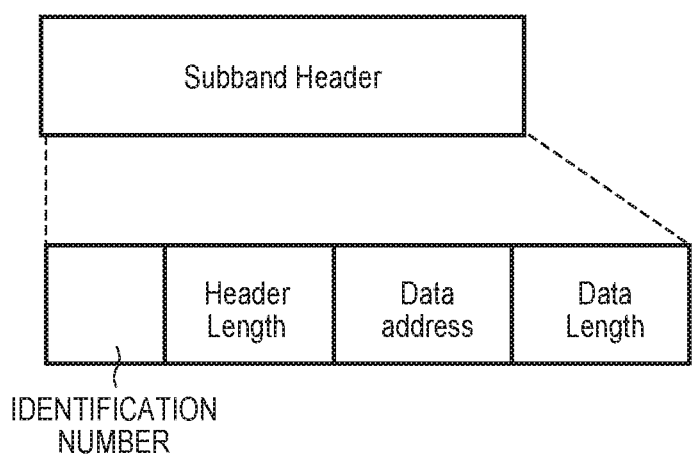
FIG. 11 is a diagram illustrating an example of the data structure of a sub-band header part.

FIG. 11 illustrates the data structure of the sub-band header part. Here, an identification number, a header state, the header size, and the address and data size of the data part are recorded.

By recording the information described above, compressed and encoded data can be developed appropriately regardless of whether or not white balancing has been applied.

Using the configuration described above makes it possible to determine whether or not white balancing is necessary for an input image. The white balance processing is carried out only when white balancing is necessary, which makes it possible to suppress image quality degradation caused by color shifts or the like regardless of the input image.

Additionally, a configuration is also possible in which the operation unit 151 illustrated in FIG. 1 is configured so that the user can turn the automatic white balance changes on or off. In this case, the control unit 150 outputs control signals so that the white balance is changed only when the automatic white balance changes have been turned on by the user, and the white balance is not changed when the automatic white balance changes have been turned off by the user.

Although the foregoing has described a first embodiment, the scope of the technical spirit of the present invention is not intended to be limited to the foregoing embodiment, and is to be changed as appropriate depending on the format of the circuitry in question.

Second Embodiment

A second embodiment will now be described. The apparatus configuration according to the present second embodiment is the same as that illustrated in FIG. 1 and described in the first embodiment. However, the processing carried out by the RAW compression encoding unit 105, and the data recorded to a recording medium group 107, according to the present second embodiment are different from in the first embodiment, and will therefore be described in detail.

Figure 12:
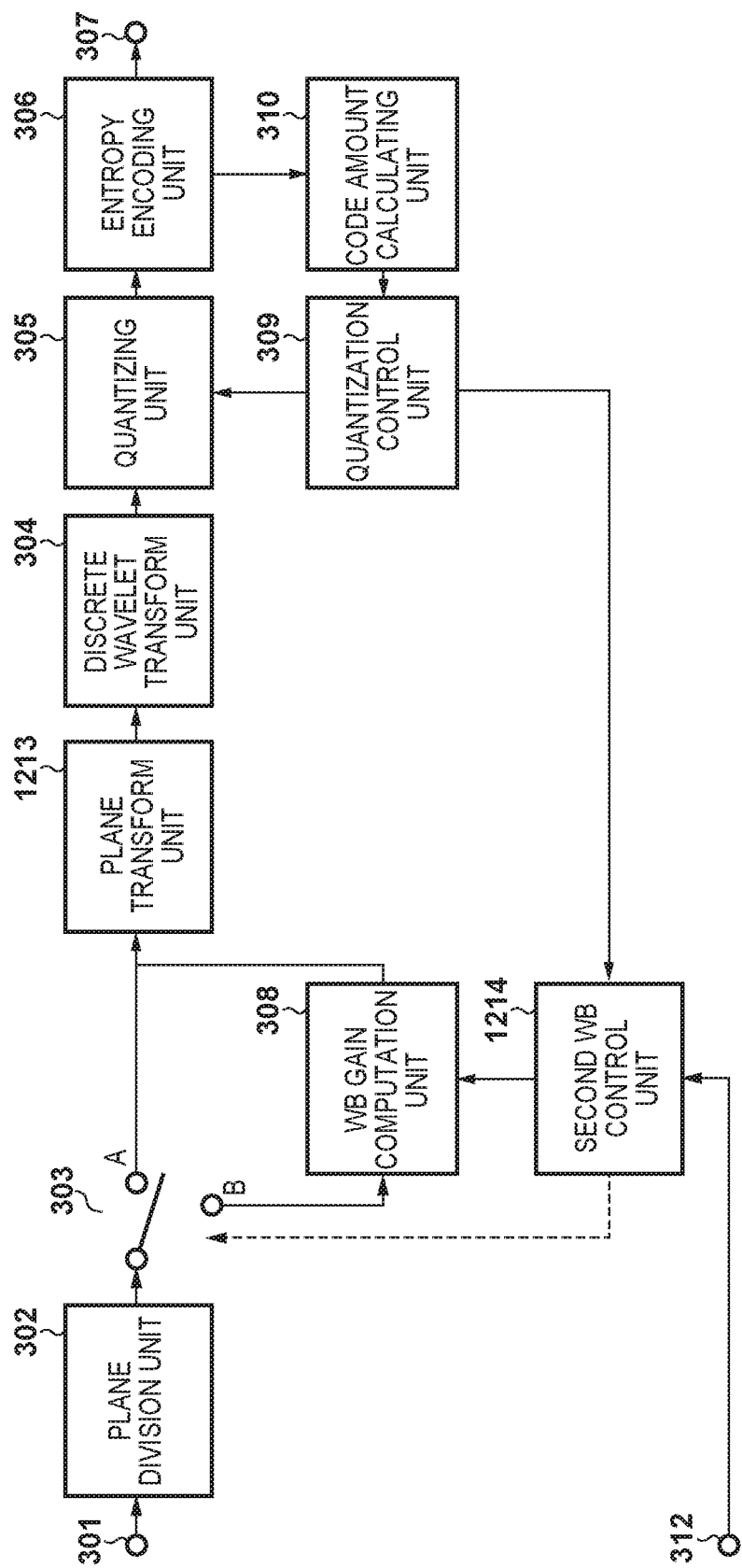
FIG. 12 is a block diagram illustrating a RAW compression encoding unit according to a second embodiment.

FIG. 12 is a block diagram illustrating the configuration of the RAW compression encoding unit 105 according to the present second embodiment. Processing units that are the same as those illustrated in FIG. 3 and described earlier in the first embodiment are given the same reference signs, and will not be described. FIG. 12 differs from FIG. 3 in that a plane transform unit 1213 has been added, and the WB control unit 311 of FIG. 3 has been replaced with a second WB control unit 1214.

Processing performed by the RAW compression encoding unit 105 in the present second embodiment will be described next with reference to FIG. 12.

The plane division unit 302 inputs Bayer array RAW image data through the input terminal 301. The plane division unit 302 then divides the input RAW image data into each of the color components. The number of pixels in the green (G) component is twice the number of pixels in each of the red (R) and blue (B) components. Accordingly, the green adjacent to red (R) in the horizontal direction is defined as G1, and the green adjacent to blue (B) in the horizontal direction is defined as G2. The plane division unit 302 divides the input RAW image data into four planes, namely R, G1, G2, and B planes, and outputs the resulting plane data to the switch 303.

The switch 303 sets the output destination of each plane to either the plane transform unit 1213 or the WB gain computation unit 308, under the control of the second WB control unit 1214. Here, the plane transform unit 1213 being selected as the output destination by the switch 303 means that the planes will not pass through the WB gain computation unit 308, and will therefore not be subjected to white balance correction processing. On the other hand, when the WB gain computation unit 308 is selected as the output destination by the switch 303, each plane is multiplied by gain value by the WB gain computation unit 308, and is then supplied to the plane transform unit 1213.

The second WB control unit 1214 controls the selection by the switch 303 in accordance with a WB gain value calculated by the WB gain calculating unit 104 and which is input from the parameter input terminal 312, and the quantization parameters Qp output by the quantization control unit 309, which will be described later (this control will be described in detail later).

The plane transform unit 1213 according to this embodiment calculates a luma component Y and three chroma components C1, C2, and C3 in accordance with the following equations (7) to (10), and outputs those components.

$$Y=(R+G1+G2+B)/4 \quad (7)$$

$$C1=R-G1 \quad (8)$$

$$C2=B-G2 \quad (9)$$

$$C3=(R+G1)/2-(B+G2)/2 \quad (10)$$

Then, the plane transform unit 1213 generates Y, C1, C2, and C3 planes, each of which is constituted by a single component, and outputs those planes to the discrete wavelet transform unit 304. In other words, the four planes to be encoded according to the present second embodiment are the Y plane, indicating a luma component, and the C1, C2, and C3 planes, indicating chroma components.

Figure 13:
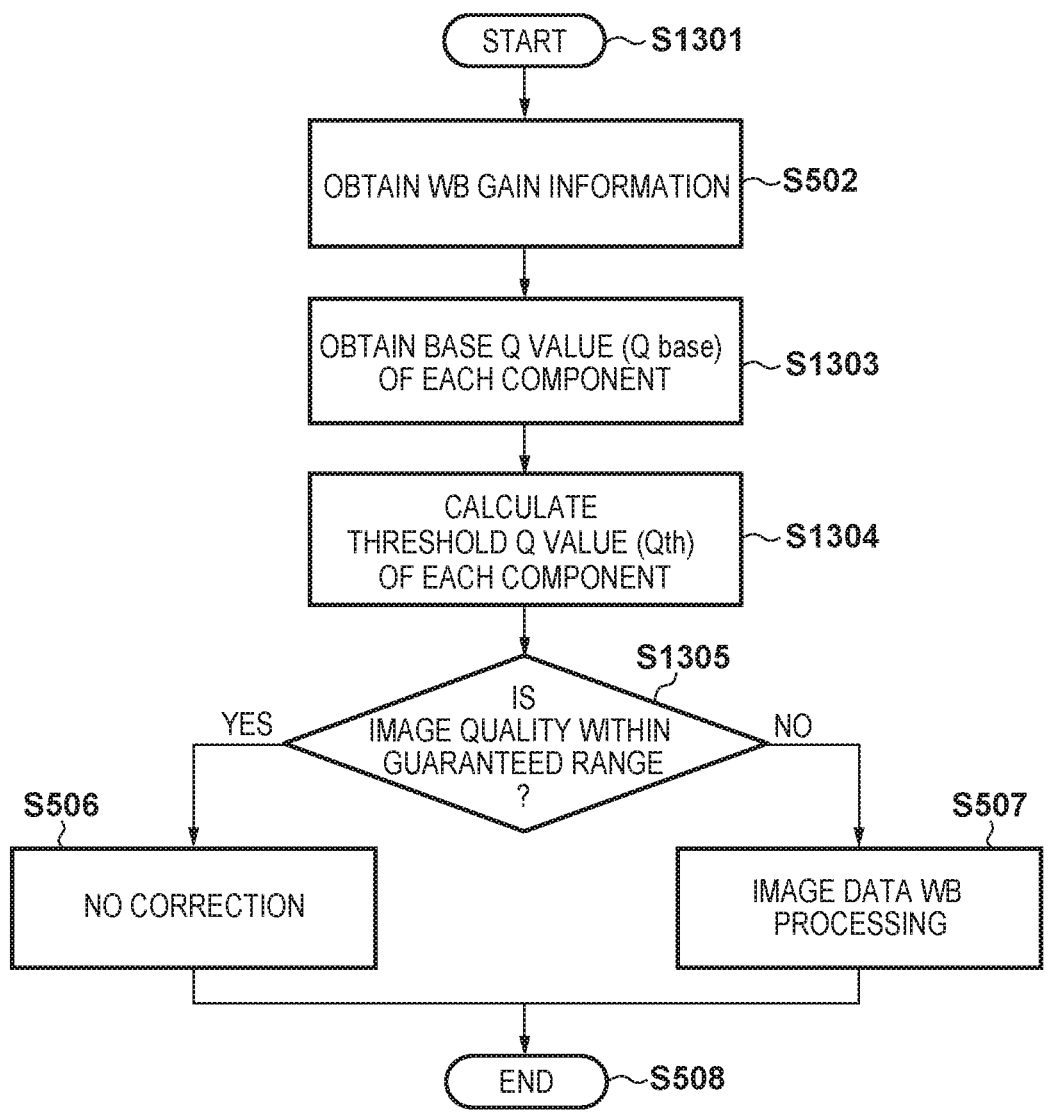
FIG. 13 is a flowchart illustrating an example of processing by a second WB control unit.

FIG. 13 is a flowchart illustrating the details of the processing carried out by the second WB control unit 1214. The processing carried out by the second WB control unit 1214 will be described next with reference to FIG. 13.

In FIG. 13, the second WB control unit 1214 starts the processing in step S1301. In step S502, the second WB control unit 1214 obtains the WB gain information output by the WB gain calculating unit 104. The WB gain information has a different gain value for each color component. The gain values for red (R), green (G), and blue (B) are represented by Gain_R, Gain_G, and Gain_B, respectively. However, in the present embodiment, when green (G) is used as a reference and Gain_G is fixed to "1", it is only necessary to obtain Gain_R and Gain_B as the WB gain information.

Next, in step S1303, the second WB control unit 1214 takes Lv1 HL of each plane as the base quantization parameters, among the quantization parameters output by the quantization control unit 309, and obtains Qbase_Y. Qbase_C1, Qbase_C2, and Qbase_C3 for the luma and chroma components Y, C1. C2, and C3, respectively.

Then, in step S1304, the second WB control unit 1214 calculates thresholds Qth_Y, Qth_C1, Qth_C2, and Qth_C3 at which the image quality can be guaranteed, for the luma component Y and the chroma components C1, C2, and C3, respectively. Desired quantization parameters Qth_Ybase, Qth_C1base, Qth_C2base, and Qth_C3base are set for these thresholds in advance. The second WB control unit 1214 then finds the thresholds for the luma component Y and the chroma components C1, C2, and C3 as follows.

First, the second WB control unit 1214 computes the following equations (11) to (13), for when functions returning a plurality of maximum values are taken as "Max( )".

$$\text{Gain\_max}=\text{Max}(\text{Gain\_}R,\text{Gain\_}G,\text{Gain\_}B) \quad (11)$$

$$\text{Gain\_}RG=\text{Max}(\text{Gain\_}R,\text{Gain\_}G) \quad (12)$$

$$\text{Gain\_}BG=\text{Max}(\text{Gain\_}G,\text{Gain\_}B) \quad (13)$$

Then, the second WB control unit 1214 finds the thresholds for the luma component Y and chroma components C1, C2, and C3 according to the following equations (14) to (17).

$$Qth\_Y=Qth\_Y\text{base}/\text{Gain\_max} \quad (14)$$

$$Qth\_C1=Qth\_C1\text{base}/\text{Gain\_}RG \quad (15)$$

$$Qth\_C2=Qth\_C2\text{base}/\text{Gain\_}BG \quad (16)$$

$$Qth\_C3=Qth\_C3\text{base}/\text{Gain\_max} \quad (17)$$

Then, in step S1305, the second WB control unit 1214 determines whether or not the image quality for each of the color components is within a guaranteed range.

The following is a specific example. The second WB control unit 1214 first determines whether or not the following equations (18) to (21) are satisfied.

for the luma component Y, $$Qth\_Y>Q\text{base\_}Y \quad (18)$$

for the chroma component C1, $$Qth\_C1>Q\text{base\_}C1 \quad (19)$$

for C2, $$Qth\_C2>Q\text{base\_}C2 \quad (20)$$

for C3, $$Qth\_C3>Q\text{base\_}C3 \quad (21)$$

Then, if all of the equations (18) to (21) are satisfied, the second WB control unit 1214 determines that the image quality of the picture to be encoded is within the guaranteed range. Accordingly, the second WB control unit 1214 determines in step S506 that the white balance correction processing is not necessary, and outputs a control signal so that the switch 303 selects the terminal A.

However, if even one of the equations (18) to (21) is not satisfied, the second WB control unit 1214 determines that the image quality is outside of the guaranteed range. Accordingly, in step S507, the second WB control unit 1214 outputs a control signal so that the switch 303 selects the terminal B, in order to carry out the white balance correction processing.

Once the processing of either step S506 or step S507 has been carried out, the second WB control unit 1214 ends the present processing in step S1308.

In the first embodiment described above, whether or not to carry out the white balance correction processing is determined on the basis of the quantization parameters for the encoded data of the green component, for the reason that human sight is more sensitive to brightness than color. However, in the present second embodiment, the determination is made on the basis of the encoding parameters for the pure luma component Y, rather than using the green component as a substitute for brightness. This makes it possible to guarantee the image quality and carry out the encoding process at a higher level of accuracy.

Note that when decoding the encoded data according to the present second embodiment, the G1, G2, R and B component values may be back-calculated from the Y, C1, C2, and C3 planes resulting from the decoding, and a Bayer array RAW image may then be generated.

Additionally, although the present embodiment describes color conversion using equations (7) to (10), equations (7) to (9) may use another YCbCr format such as BT.601, BT.709, or BT.2020, or a different color space conversion format entirely. In this case, equations (11) to (13) calculate the thresholds with the maximum values of the components used in equations (7) to (9) as the gain values.

The differences in the header information generated by the recording data control unit 107, and the data format thereof, between the present second embodiment and the foregoing first embodiment will be described next.

Figure 14:
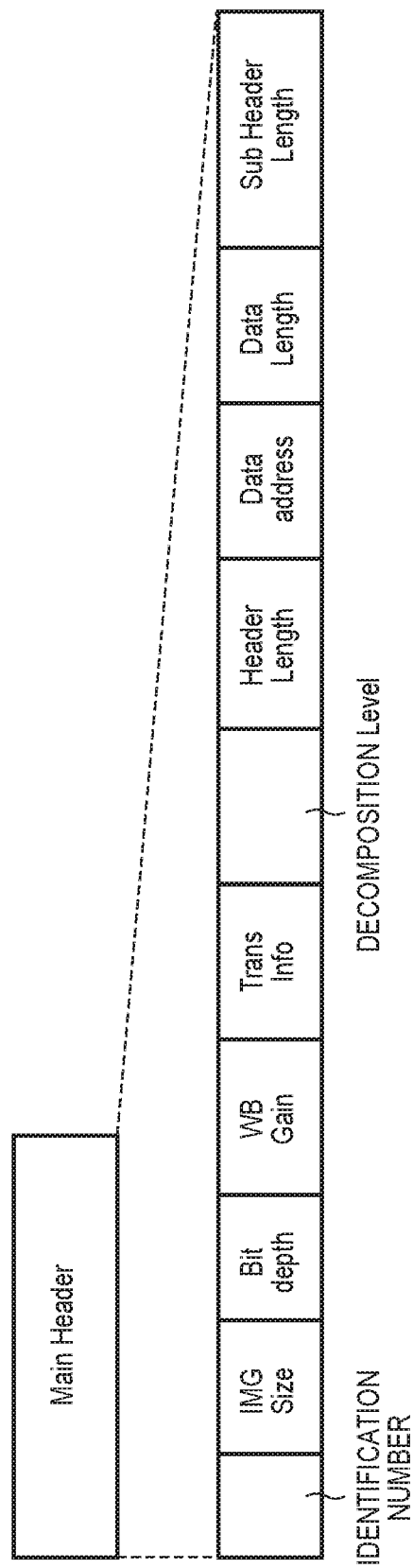
FIG. 14 is a diagram illustrating an example of the data structure of a main header part according to the second embodiment.

FIG. 14 illustrates the data structure of the main header part according to the present embodiment. Here, an identification number, the image size, the image bit width, the WB gain value, data conversion information, the wavelet transform decomposition level, the header size, a thumbnail image, and an address and data size of the data part are included.

Information specifying the conversion method when converting the data, such as when converting to the luma component Y and the chroma components C1, C2, and C3 as described above, is recorded in the data conversion information.

Using the configuration described above makes it possible to determine whether or not white balancing is necessary for an input image. The white balance processing is carried out only when white balancing is necessary, which makes it possible to suppress image quality degradation caused by color shifts or the like regardless of the input image.

Although the foregoing has described a second embodiment, the scope of the technical spirit of the present invention is not intended to be limited to the foregoing embodiment, and is to be changed as appropriate depending on the format of the circuitry in question.

Third Embodiment

A third embodiment will now be described. The apparatus configuration according to the present third embodiment is the same as that illustrated in FIG. 1 and described in the first embodiment.

When multiplying the gain values with the color component values during the white balancing, a value will be clipped at the upper limit value if it reaches that upper limit value. For example, when one component is 8 bits, the upper limit value is 255. As such, the lower the gain value is, the better. This is because even if a complete white balancing is not applied, an intermediate gain value can be multiplied within the range that guarantees the image quality, and the image may then be encoded. The remaining gain value may then be multiplied when the image is developed. The following will therefore describe an example in which an intermediate gain value is multiplied.

Figure 15:
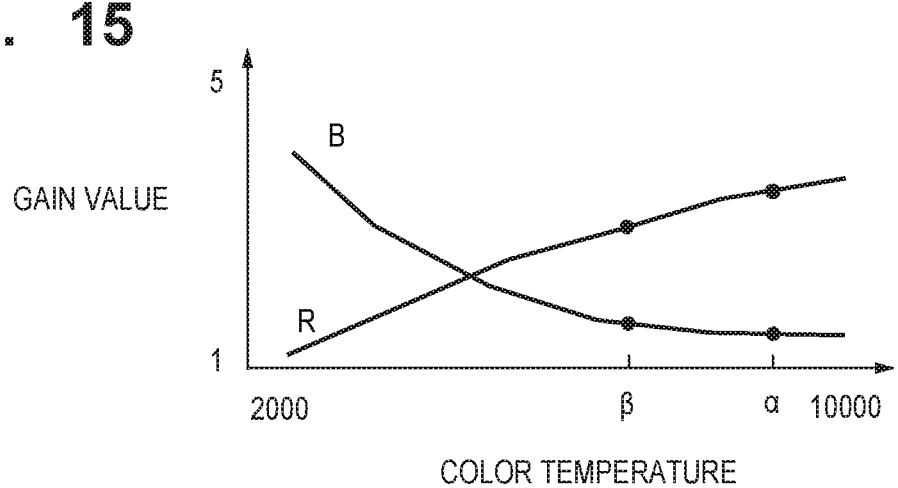
FIG. 15 is a diagram illustrating a relationship between color temperature and gain according to a third embodiment.

FIG. 15 is a table illustrating a relationship between color temperature and gain value for R and B (the table being stored in memory (not shown)). The intermediate gain value will be described with reference to FIG. 15.

In FIG. 15, it is assumed that the histograms for the color components are as indicated by the graphs in FIG. 6A, at a current color temperature of a. Assume also that the graphs illustrated in FIG. 6B are obtained by multiplying the WB gain value when the color temperature is a.

For example, assume that the gain values are as follows when the color temperature is a (the G component is the reference value of "1").

$Gain\_R(\alpha) = 2.50$ $Gain\_B(\alpha) = 1.50$

Assume, too, that when the color temperature is B, the gain values are as follows.

$Gain\_R(\beta) = 2.00$ $Gain\_B(\beta) = 1.60$

Figure 16:
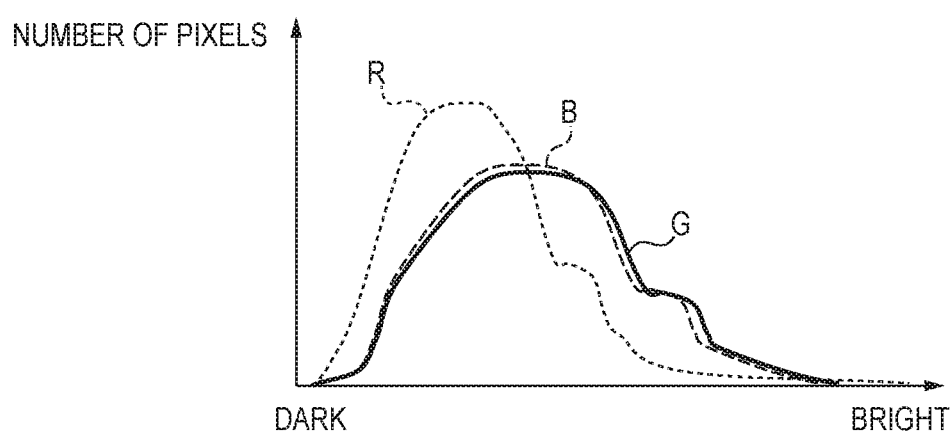
FIG. 16 is a diagram illustrating a frequency distribution for each of color components after gain adjustment according to the third embodiment.
Figure 17:
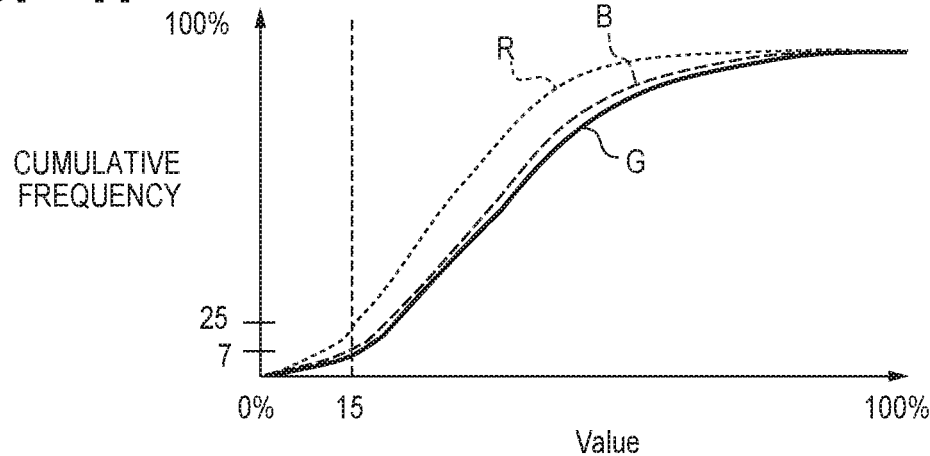
FIG. 17 is a graph illustrating cumulative frequencies of wavelet coefficients for each of color components according to the third embodiment.

The histograms of the color components become as illustrated in FIG. 16 when the WB gain value at the color temperature β is applied to the R and B planes. FIG. 17 indicates graphs of the wavelet coefficient cumulative frequencies at this time.

While R is 25% at the location of 15% on the wavelet coefficient cumulative frequency horizontal axis described in the first embodiment with reference to FIG. 6A, R is 12% in FIG. 17. In other words, if a mid-level, rather than complete, white balance correction processing is carried out, the number of wavelet coefficients that become 0 due to quantization can be reduced. The number of values that exceed the upper limit value when the WB gain value is low can also be reduced.

Based on the above, it can be seen that the WB gain value need not be perfectly applied to locations appropriate for white balancing, within the range at which the image quality can be guaranteed. As such, the following will describe processing for determining the WB gain value in accordance with a color temperature at which the image quality can be guaranteed.

Using FIG. 15, the threshold for each color component at a color temperature can be found through equations (1) and (2) described in the first embodiment.

The gain values at a color temperature x are expressed as Gain_R(x) and Gain_B(x). Such being the case, R and B thresholds Qth_R(x) and Qth_B(x) at the color temperature x are as indicated by the following equations (22) and (23).

$$Qth\_R(x)=Qth\_G/Gain\_R(x) \quad (22)$$

$$Qth\_B(x)=Qth\_G/Gain\_B(x) \quad (23)$$

With respect to G1 and G2, when equations 4 and 5 described in the first embodiment are satisfied, whether or not each color component is within the range where the image quality is guaranteed at the color temperature x is as indicated below:

for red (R), $$Qth\_R(x) > Qbase\_R \quad (24)$$

for blue (B), $$Qth\_B(x) > Qbase\_B \quad (25)$$

By finding the color temperature x at which equations 24 and 25 are satisfied makes it possible to determine the range at which the image quality can be guaranteed.

With respect to the WB gain value in the header illustrated in FIG. 9, if the white balance computation is carried out using the gain values in the aforementioned range, correction WB gain values Gain_Rt and Gain_Bt are calculated in order to record the WB gain value.

When the gain values from when the color temperature is t are used, the following equations (26) and (27) are established:

$$Gain\_Rt=Gain\_R/Gain\_R(t) \quad (26)$$

$$Gain\_Bt=Gain\_B/Gain\_B(t) \quad (27)$$

The foregoing are then recorded in the header as WB gain values.

Then, the number of upper limit clipping values can be suppressed by multiplying the white balance gain values within the aforementioned guaranteed range.

Likewise, the equations (11) to (13) described in the second embodiment become the following equations (27) to (30).

$$Gain\_max(x)=Max(Gain\_R(x),Gain\_G,Gain\_B(x)) \quad (27)$$

$$Gain\_RG(x)=Max(Gain\_R(x),Gain\_G) \quad (28)$$

$$Gain\_BG(x)=Max(Gain\_G,Gain\_B(x)) \quad (29)$$

The threshold for the color components are then calculated through the following equations (30) to (33).

$$Qth\_Y(x)=Qth\_Ybase/Gain\_max(x) \quad (30)$$

$$Qth\_C1(x)=Qth\_C1base/Gain\_RG(x) \quad (31)$$

$$Qth\_C2(x)=Qth\_C2base/Gain\_BG(x) \quad (32)$$

$$Qth\_C3(x)=Qth\_C3base/Gain\_max(x) \quad (33)$$

With respect to whether or not each component is within the range at which the image quality is guaranteed at the color temperature x, first, it is determined whether or not the following inequalities are satisfied.

for Y, $$Qth\_Y(x) > Qbase\_Y \quad (34)$$

for C1, $$Qth\_C1(x) > Qbase\_C1 \quad (35)$$

for C2, $$Qth\_C2(x) > Qbase\_C2 \quad (36)$$

for C3, $$Qth\_C3(x) > Qbase\_C3 \quad (37)$$

By finding the color temperature x at which all of equations (34) to (37) are satisfied makes it possible to determine the range at which the image quality can be guaranteed.

With respect to the WB gain value in FIG. 14, if the white balance computation is carried out using the gain values in the aforementioned range, correction WB gain values Gain_Rt and Gain_Bt are calculated in order to record the WB gain value. These are calculated through equations 26 and 27, and recorded as WB gain values.

Accordingly, by multiplying the gain values within a range at which the image quality can be guaranteed, using gain values for the color temperature illustrated in FIG. 15, the number of values that reach the upper limit and are clipped can be reduced more than when normal white balance processing is carried out. Accordingly, degradation in image quality, such as color shifts or the like, can be suppressed even further, regardless of the input image.

Although the foregoing has described a third embodiment, the scope of the technical spirit of the present invention is not intended to be limited to the foregoing embodiment, and is to be changed as appropriate depending on the format of the circuitry in question.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-197844, filed Oct. 19, 2018, which is hereby incorporated by reference herein in its entirety.

What is claimed is:

1. An image encoding apparatus that encodes a frame obtained by an image capturing unit as RAW image data, the apparatus comprising:
a memory storing a program; and
one or more processors which execute the program, wherein the one or more processors function as:
a calculating unit that finds a color temperature of the RAW image data of a target frame which is to be encoded, and calculates a gain value for each of color components in order to apply white balancing to the RAW image data;
a generating unit that generates a plurality of planes, each plane constituted by data of a single color component, from the RAW image data in the target frame;
an adjusting unit that adjusts the white balance of each plane obtained by the generating unit on the basis of the gain calculated by the calculating unit;
an encoding unit that encodes each plane by frequency-transforming, quantizing, and encoding each plane; and
a control unit that, when each plane of the target frame is encoded by the encoding unit, encodes the plurality of planes resulting from the adjustment by the adjusting unit, on the basis of quantization parameters for each plane of the RAW image data one frame before the target frame wherein the calculating unit calculates relative gain values for R and B components when the gain of a G component is a reference value of 1, and
wherein the control unit:
calculates R and B thresholds on the basis of a pre-set threshold for the G component and the R and B component gain values calculated by the calculating unit;
compares sub-band transform coefficients at a predetermined decomposition level for each component, used in the quantization when the encoding unit encodes the RAW image data from the previous frame, with the thresholds for each component; and
determines, on the basis of the result of the comparison, whether to use the plurality of planes generated by the generating unit, or the plurality of planes resulting from the adjustment by the adjusting unit, as the target of the encoding by the encoding unit for the target frame.

2. The apparatus according to claim 1,
wherein the control unit switches between encoding the plurality of planes generated by the generating unit or encoding the plurality of planes resulting from the adjustment by the adjusting unit on the basis of the quantization parameters and the gain value calculated by the calculating unit.

3. The apparatus according to claim 1,
wherein when each plane of the target frame is encoded by the encoding unit, the control unit switches between encoding the plurality of planes generated by the generating unit or encoding the plurality of planes resulting from the adjustment by the adjusting unit, on the basis of the quantization parameters for each plane in the RAW image data one frame before the target frame and the gain value calculated by the calculating unit for the RAW image data of the target frame.

4. An image encoding apparatus that encodes a frame obtained by an image capturing unit as RAW image data, the apparatus comprising:
a memory storing a program; and
one or more processors which execute the program, wherein the one or more processors function as:
a calculating unit that finds a color temperature of the RAW image data of a target frame which is to be encoded, and calculates a gain value for each of color components in order to apply white balancing to the RAW image data;
a generating unit that generates a plurality of planes, each plane constituted by data of a single color component, from the RAW image data in the target frame;
an adjusting unit that adjusts the white balance of each plane obtained by the generating unit on the basis of the gain calculated by the calculating unit;
an encoding unit that encodes each plane by frequency-transforming, quantizing, and encoding each plane; and
a control unit that, when each plane of the target frame is encoded by the encoding unit, encodes the plurality of planes adjusted by the adjusting unit, on the basis of quantization parameters;
wherein pixels of the color components in the RAW image data are in a Bayer array;
wherein the generating unit generates an R plane constituted only by pixels of an R component, a G1 plane constituted only by pixels of a G1 component, a G2 plane constituted only by pixels of a G2 component, and a B plane constituted only by pixels of a B component;
wherein the frequency transform executed by the encoding unit is a discrete wavelet transform up to a pre-set decomposition level,
wherein the encoding unit includes a conversion unit that converts the R plane, the G1 plane, the G2 plane, and the B plane into a Y plane for a luma component, and a C1 plane, a C2 plane, and a C3 plane chroma components,
wherein the encoding unit carries out the discrete wavelet transform, quantization, and entropy encoding on the Y plane, the C1 plane, the C2 plane, and the C3 plane, and
wherein the control unit:
finds a threshold for each of Y, C1, C2, and C3 on the basis of the R and B component gain values calculated by the calculating unit relative to the G component gain value serving as a reference;
compares sub-band transform coefficients at a predetermined decomposition level for each of the Y, C1, C2, and C3 components, used in the quantization when the encoding unit encodes the RAW image data from the previous frame, with the thresholds for each component; and
determines, on the basis of the result of the comparison, whether to use the plurality of planes generated by the generating unit, or the plurality of planes resulting from the adjustment by the adjusting unit, as the target of the encoding by the encoding unit for the target frame.

5. An image encoding apparatus that encodes a frame obtained by an image capturing unit as RAW image data, the apparatus comprising:
a memory storing a program; and
one or more processors which execute the program, wherein the one or more processors function as:
a calculating unit that finds a color temperature of the RAW image data of a target frame which is to be encoded, and calculates a gain value for each of color components in order to apply white balancing to the RAW image data;
a generating unit that generates a plurality of planes, each plane constituted by data of a single color component, from the RAW image data in the target frame;

an adjusting unit that adjusts the white balance of each plane obtained by the generating unit on the basis of the gain calculated by the calculating unit;

an encoding unit that encodes each plane by frequency-transforming, quantizing, and encoding each plane; and a control unit that, when each plane of the target frame is encoded by the encoding unit, encodes the plurality of planes resulting from the adjustment by the adjusting unit, on the basis of quantization parameters for each plane of the RAW image data one frame before the target frame;

wherein the calculating unit calculates relative gain values for R and B components when the gain of a G component is a reference value of 1, wherein the control unit includes:

a table expressing the gain of each color component with respect to a color temperature for applying white balance, and wherein the control unit:

finds a threshold for each component;

compares sub-band transform coefficients at a predetermined decomposition level for each component, used in the quantization when the encoding unit encodes the RAW image data from the previous frame, with the thresholds for each component, and determines a color temperature that satisfies a predetermined condition; and sets the gain value for each color component in accordance with the determined color temperature in the adjusting unit.

* * * * *